United States Patent
Sugizaki

(10) Patent No.: US 12,158,406 B2
(45) Date of Patent: Dec. 3, 2024

(54) BINDING CAPACITY EVALUATION APPARATUS AND BINDING CAPACITY EVALUATION METHOD

(71) Applicant: KABUSHIKI KAISHA TOSHIBA, Tokyo (JP)

(72) Inventor: Yoshiaki Sugizaki, Fujisawa Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 350 days.

(21) Appl. No.: 17/670,338

(22) Filed: Feb. 11, 2022

(65) Prior Publication Data

US 2023/0082723 A1   Mar. 16, 2023

(30) Foreign Application Priority Data

Sep. 16, 2021 (JP) .................. 2021-150801

(51) Int. Cl.
  *G01N 15/06* (2024.01)
  *G01N 15/075* (2024.01)
(52) U.S. Cl.
  CPC ..... *G01N 15/06* (2013.01); *G01N 2015/0687* (2013.01); *G01N 15/075* (2024.01)
(58) Field of Classification Search
  CPC ................. G01N 15/06; G01N 15/075; G01N 2015/0687
  See application file for complete search history.

(56) References Cited

U.S. PATENT DOCUMENTS 8,974,680 B2 *  3/2015  Tanaka ................ G11B 5/743
                                                                 438/692
2021/0080440 A1   3/2021  Sugizaki

FOREIGN PATENT DOCUMENTS

CN     100541184 C  *  9/2009
JP     2021-47037 A     3/2021

OTHER PUBLICATIONS

English Machine Translation of CN 100541184 C, Sep. 16, 2009, translated online Jul. 2024 (Year: 2009).*

* cited by examiner

*Primary Examiner* — David Z Huang
(74) *Attorney, Agent, or Firm* — Finnegan, Henderson Farabow, Garrett & Dunner, LLP

(57) ABSTRACT

A binding capacity evaluation apparatus includes a first solution tank into which a first solution is input, the first solution including a hydrophobic substance and a hydrophilic substance; a second solution tank into which a second solution is input, the second solution including water as a major component; a light irradiation device irradiating light on a third solution including a mixture of the first and second solutions; a light-receiving device receiving light passing through the third solution; and a light transmittance measuring device measuring light transmittance by using an intensity of the light received by the light-receiving device. The apparatus uses the light transmittance to detect when the hydrophobic substance becomes supersaturated in the second solution.

4 Claims, 5 Drawing Sheets

BINDING CAPACITY EVALUATION APPARATUS AND BINDING CAPACITY EVALUATION METHOD

CROSS-REFERENCE TO RELATED APPLICATION

This application is based upon and claims the benefit of priority from Japanese Patent Application No. 2021-150801, filed on Sep. 16, 2021; the entire contents of which are incorporated herein by reference.

FIELD

Embodiments described herein relate generally to a binding capacity evaluation apparatus and a binding capacity evaluation method.

BACKGROUND

Generally, the evaluation of the binding capacity between a trapping molecule and a ligand is performed using a method such as SPR (Surface Plasmon Resonance), QCM (Quartz Crystal Microbalance), ITC (Isothermal Titration calorimetry), nano DSC (Differential Scanning calorimetry), etc.

DETAILED DESCRIPTION

Figure 1:
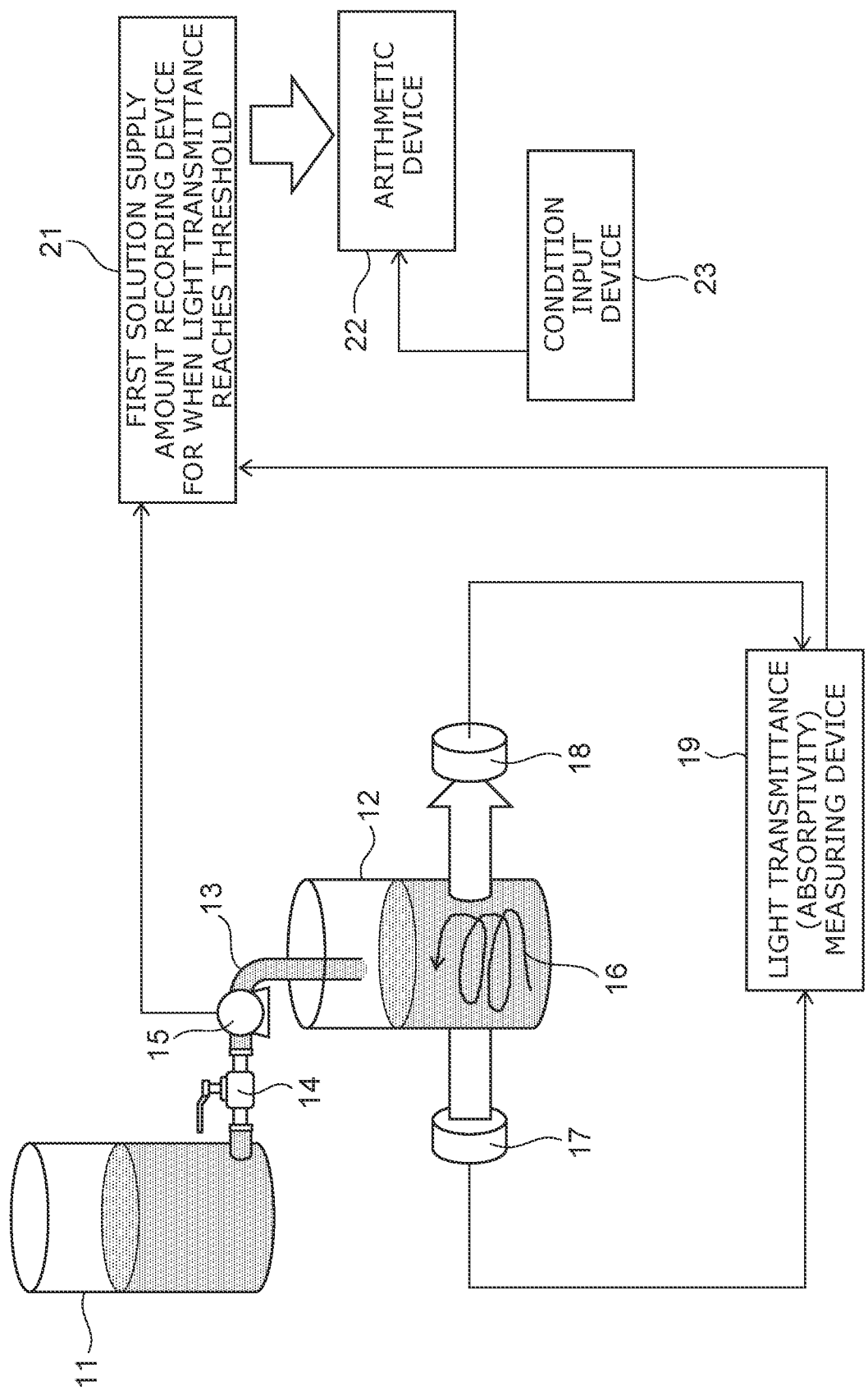
FIG. 1 is a schematic configuration diagram of a binding capacity evaluation apparatus of one embodiment of the invention.

According to one embodiment, a binding capacity evaluation apparatus includes a first solution tank into which a first solution is input, the first solution including a hydrophobic substance and a hydrophilic substance; a second solution tank into which a second solution is input, the second solution including water as a major component; a solution supply device supplying the first solution from the first solution tank to the second solution tank at a controlled rate; a stirring device stirring a third solution inside the second solution tank, the third solution including a mixture of the first and second solutions; a light irradiation device irradiating light on the third solution; a light-receiving device receiving light passing through the third solution; and a light transmittance measuring device measuring light transmittance by using an intensity of the light received by the light-receiving device. The apparatus uses the light transmittance to detect when the hydrophobic substance becomes supersaturated in the second solution.

According to one embodiment, a binding capacity evaluation method includes a first process and a second process. The first process includes supplying a first solution to a second solution at a controlled rate, the first solution including a hydrophobic substance and a hydrophilic substance with a mole equivalent ratio of 1:α, the second solution including water as a major component; irradiating light on a third solution, and measuring a light transmittance by using an intensity of light passing through the third solution, the third solution including a mixture of the first and second solutions; using the light transmittance to detect when the hydrophobic substance becomes supersaturated in the second solution; and calculating a concentration X of the hydrophobic substance in the second solution by using a supply amount of the first solution into the second solution when the hydrophobic substance becomes supersaturated in the second solution. The second process includes supplying a first solution to a second solution at a controlled rate, the first solution including the hydrophobic substance but not including the hydrophilic substance, the second solution including water as a major component; irradiating light on a third solution, and measuring a light transmittance by using an intensity of light passing through the third solution, the third solution including a mixture of the first and second solutions; using the light transmittance to detect when the hydrophobic substance becomes supersaturated in the second solution; and calculating a concentration x of the hydrophobic substance in the second solution by using a supply amount of the first solution into the second solution when the hydrophobic substance becomes supersaturated in the second solution. The dissociation constant Kd of the hydrophobic substance and the hydrophilic substance in the second solution is calculated from α, X, and x by using Formula (1).

$$Kd = \frac{x^2 + xX(\alpha - 1)}{X - x} \quad (1)$$

Embodiments will now be described with reference to the drawings. The same components in the drawings are marked with the same reference numerals.

FIG. 1 is a schematic configuration diagram of a binding capacity evaluation apparatus of one embodiment of the invention.

The binding capacity evaluation apparatus of the embodiment includes a first solution tank 11 and a second solution tank 12. A first solution that includes a hydrophobic substance and a hydrophilic substance that has a higher affinity with water than the hydrophobic substance is input to the first solution tank 11. For example, limonene is an example of a hydrophobic substance. For example, a peptide that has a specific amino acid sequence is an example of a hydrophilic substance. A second solution that includes water as a major component is input to the second solution tank 12.

The first solution tank 11 and the second solution tank 12 are connected by a pipe 13. A valve 14 and a solution supply device 15 are connected in the pipe 13. The valve 14 opens and closes the flow channel inside the pipe 13. The solution supply device 15 supplies the first solution from the first solution tank 11 to the second solution tank 12 at a controlled rate (a constant flow rate). The solution supply device 15 includes, for example, a pump.

A stirring device 16 is located in the second solution tank 12 and stirs a third solution in which the first and second solutions are mixed inside the second solution tank 12.

The binding capacity evaluation apparatus of the embodiment further includes a light irradiation device 17, a light-receiving device 18, and a light transmittance measuring device 19. The light irradiation device 17 irradiates light on the third solution inside the second solution tank 12. The light-receiving device 18 receives light that passes through the third solution. The light transmittance measuring device 19 measures the light transmittance (the absorptivity) by using the intensity of the light received by the light-receiving device 18. The light transmittance is the proportion of the light from the light irradiation device 17 that passes through the third solution. The absorptivity is the proportion of the light from the light irradiation device 17 that is absorbed by the third solution.

The binding capacity evaluation apparatus of the embodiment further includes a first solution supply amount recording device 21, an arithmetic device 22, and a condition input device 23.

The first solution supply amount recording device 21 records the supply amount of the first solution to the second solution tank 12 when the light transmittance measured by a transmittance measuring device 19 reaches a preset threshold.

Information such as the input amount of the second solution into the second solution tank 12, the mixing ratio of the hydrophobic substance and the hydrophilic substance in the first solution, etc., are input to the arithmetic device 22 by the condition input device 23.

The arithmetic device 22 calculates the dissociation constant of the hydrophobic substance and the hydrophilic substance in the first solution by using information from the first solution supply amount recording device 21 and the condition input device 23.

Figure 2:
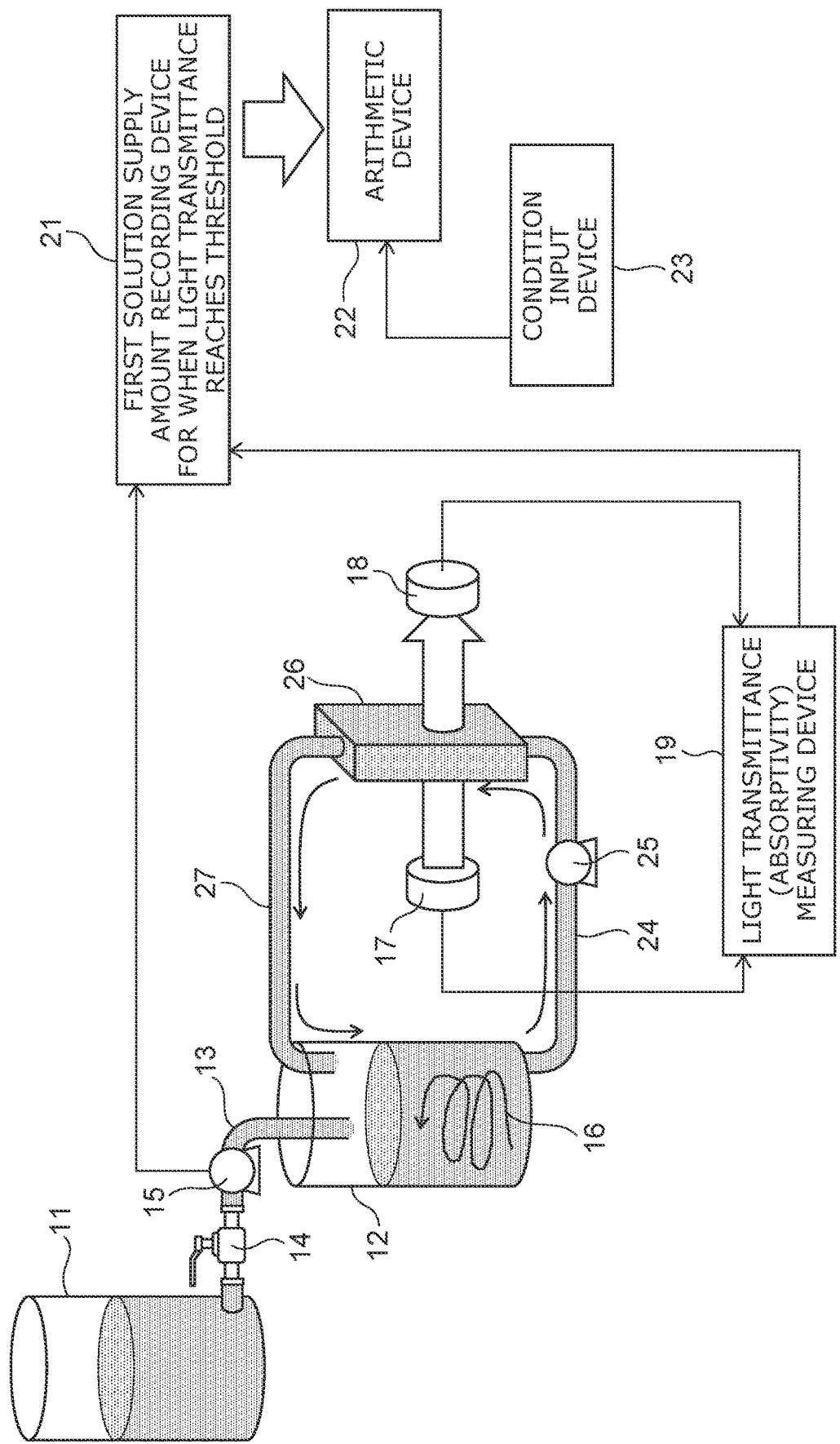
FIG. 2 is a schematic configuration diagram of a binding capacity evaluation apparatus of another embodiment of the invention.

The light is not limited to being irradiated on the third solution inside the second solution tank 12; as shown in FIG. 2, a configuration can be used in which the light is irradiated on the third solution inside a flow cell 26.

The second solution tank 12 and the flow cell 26 are connected by pipes 24 and 27. The capacity of the flow cell 26 is less than the capacity of the second solution tank 12. For example, a pump 25 is connected to the pipe 24. The driving of the pump 25 supplies the third solution of the second solution tank 12 to the flow cell 26 via the pipe 24 and returns the third solution from the flow cell 26 to the second solution tank 12 via the pipe 27. In other words, the third solution circulates between the second solution tank 12 and the flow cell 26.

The hydrophobic substance (the ligand) that does not easily dissolve in the aqueous solution that has water as a major component can dissolve more easily in the aqueous solution by being trapped by the hydrophilic substance (the probe molecule) in the aqueous solution. Although methods such as SPR, QCM, ITC, nano DSC, etc., are generally used to evaluate the binding capacity of the probe molecule for the ligand, a ligand that is a hydrophobic substance cannot be dissolved with a high concentration in the aqueous solution; therefore, the measurement is difficult, and doubts undesirably remain regarding the accuracy. Specifically, an aqueous solution in which an organic solvent is mixed may be used to dissolve the hydrophobic substance, but the inclusion of the organic solvent undesirably weakens the hydrophobic interaction; therefore, the effects of the hydrophobic interaction that is the drive force of the binding between the probe molecule and many of the hydrophobic ligands is undesirably underestimated. Therefore, the mixing ratio of the organic solvent is reduced as much as possible; however, as a result, the concentration of the ligand undesirably decreases, and the measurement sensitivity undesirably decreases. Furthermore, the aforementioned conventional art reads the change of the dielectric constant, the change of the mass, the change of the heat amount, and the like that accompany the ligand trapping; therefore, such changes are small and difficult to measure when the binding force between the ligand and the probe molecule is low.

According to the embodiment of the invention, the supersaturation of the hydrophobic substance that cannot be dissolved in the aqueous solution and therefore separates and precipitates is detected by detecting the phenomenon of light scattering as a decrease of the light transmittance (an increase of the absorptivity). Here, the term "absorbance" is used to match general diction, but more accurately, refers not to light absorption but to scattering as described above.

Here, when the hydrophilic probe molecule that traps the hydrophobic substance (the ligand) is mixed, a constant amount of the hydrophobic ligand is trapped by the hydrophilic probe molecule; therefore, only the hydrophobic ligand that cannot be trapped by the hydrophilic probe molecule is free in the aqueous solution, and the solubility of the hydrophobic substance appears to be higher. At this time, the increase of the solubility is determined by the solubility of the original hydrophobic substance in water, the dissociation constant of the hydrophobic substance and the hydrophilic probe molecule, and the mixing ratio of the hydrophobic substance and the hydrophilic probe molecule.

Here, the solubility of the original hydrophobic substance in water can be measured using the detection of the light transmittance (the absorbance); and the mixing ratio of the hydrophobic substance and the hydrophilic probe molecule is an item that can be set; therefore, the dissociation constant of the hydrophobic substance and the hydrophilic probe molecule can be calculated.

Although details of the method for calculating the dissociation constant are described below in detail, the following Formula (1) may be used.

$$Kd = \frac{x^2 + xX(\alpha - 1)}{X - x} \qquad (1)$$

Here, Kd is the dissociation constant of the hydrophobic ligand and the hydrophilic probe molecule in the second solution; x is the solubility of the hydrophobic ligand in the second solution; $\alpha$ is the value of $\alpha$ when the mixing ratio of the hydrophobic ligand and the hydrophilic probe molecule of the first solution is 1:$\alpha$; and X is the solubility of the hydrophobic ligand in the second solution in the first solution.

The binding capacity between the hydrophobic substance and the hydrophilic probe molecule in the aqueous solution can be evaluated thereby.

First Process

In the apparatus shown in FIG. 1 or FIG. 2, a first solution that includes the hydrophobic substance and the hydrophilic substance of which the mixing ratio is set to a prescribed ratio is input to the first solution tank 11. A second solution that includes water as a major component and has an input amount set to a prescribed amount is input to the second solution tank 12.

By opening the valve 14 and driving the solution supply device 15, the first solution is supplied at a constant flow rate from the first solution tank 11 to the second solution tank 12. While the supply of the first solution to the second solution tank 12 is continued, the amount of the first solution (the amount of the hydrophilic substance and the amount of the hydrophobic substance) with respect to the constant amount of the second solution increases inside the second solution tank 12.

Light from the light irradiation device 17 is irradiated on the mixed solution (the third solution) of the first and second solutions inside the second solution tank 12 or inside the flow cell 26. The light-receiving device 18 receives the light that passes through the third solution. The light transmittance measuring device 19 measures the light transmittance (the absorptivity) by using the intensity of the light received by the light-receiving device 18. By using the light transmittance (the absorptivity), it can be detected when the hydrophobic substance becomes supersaturated in the second solution.

As the supply amount of the first solution with respect to the constant amount of the second solution increases inside the second solution tank 12, the amount of the hydrophobic substance that is not bound to the hydrophilic substance and is free in the second solution increases, and the third solution becomes cloudy. In other words, as the supply amount of the first solution with respect to the constant amount of the second solution increases inside the second solution tank 12, the light transmittance attenuates (or the absorptivity increases). For example, a threshold for the light transmittance (the absorptivity) can be preset, and the supersaturation of the hydrophobic substance in the second solution can be detected when the light transmittance (the absorptivity) reaches the threshold.

Second Process

Then, a first solution that does not include the hydrophilic substance is input to the first solution tank 11. Similarly to the first process, the second solution that includes water as a major component and has an input amount set to a prescribed amount is input to the second solution tank 12.

Then, similarly to the first process, by opening the valve 14 and driving the solution supply device 15, the first solution is supplied at a constant flow rate from the first solution tank 11 to the second solution tank 12, and the solubility of the first solution, i.e., the hydrophobic substance, in the second solution is calculated by measuring the light transmittance (the absorbance).

Here, when the hydrophobic substance is a solid or a highly viscous liquid and cannot be easily supplied as a solution, the hydrophobic substance can be diluted in a hydrophilic organic solvent as the first solution. Similarly, the hydrophobic substance can be diluted in a hydrophilic organic solvent as the first solution even if the added amount is too trace and it is difficult to supply as a solution because the solubility of the hydrophobic substance in the second solution is too low. Methanol, ethanol, isopropyl alcohol, acetone, acetonitrile, dimethylsulfoxide, dimethylformamide, etc., can be used as the hydrophilic organic solvent.

Although the measurement error due to the mixing of the hydrophilic organic solvent is practically negligible because the binding force between the hydrophilic organic solvent and the hydrophobic substance is an order of magnitude weaker than the binding force between the hydrophobic substance and the hydrophilic probe molecule, when it is desirable to perform a more accurate evaluation, the experiment results can be corrected by determining the solubility beforehand by measuring the light transmittance (the absorbance) for the hydrophobic substance directly dissolved in the second solution without using a hydrophilic organic solvent and by determining the dissociation constant by using a calculation method similar to the dissociation constant evaluation of the hydrophobic ligand and the hydrophilic probe molecule according to the embodiment.

As described below, it is most favorable for the mixing ratio of the hydrophobic ligand and the hydrophilic probe molecule (hydrophobic ligand:hydrophilic probe molecule) of the first solution input to the first solution tank 11 to be 1:1 by molar fraction. Also, it is desirable for the accuracy of the mixing ratio to be in a range within 2%, and more desirably within 0.3%.

The reason that the dissociation constant can be calculated from the measurement result in the first and second processes and the method for calculating the dissociation constant will now be described using formulas and FIGS. 3 to 5.

First, the dissociation constant is a value that indicates the binding capacity and is defined by the following Formula (2). The units are concentration; and the dissociation constant also is an indicator of the lowest concentration to which the binding can be continued. Accordingly, the binding capacity increases as the dissociation constant decreases.

$$Kd=[L][P]/[LP] \qquad (2)$$

Here, $Kd$ is the dissociation constant (mol/L), $[L]$ is the concentration of the free ligand (mol/L), $[P]$ is the concentration of the free probe molecule (mol/L), and $[LP]$ is the concentration of the association of the ligand and the probe molecule (mol/L). Formula (2) assumes that the ligand and the probe have an association of 1:1; and a formula that is slightly more complex is used when the ligand is associated with multiple sites of the probe molecule. A 1:1 association that is general for associations between low molecular-weight compounds is described herein.

The mixing ratio of the hydrophobic ligand and the hydrophilic probe molecule of the first solution input to the first solution tank 11 is set to hydrophobic ligand:hydrophilic probe molecule=1:α (mole equivalent ratio).

Formula (2) of the dissociation constant is modified as follows, where x (mol/L) is the solubility of the hydrophobic ligand in the second solution including water as a major component inside the second solution tank 12, and X (mol/L) is the input concentration of the hydrophobic ligand measured directly before the first solution in which the hydrophobic ligand and the hydrophilic probe molecule are mixed at the aforementioned ratio causes the reduction of the light transmittance (the increase of the absorbance) in the second solution.

First, the start of the change of the light transmittance (the absorbance) indicates that the concentration of the free hydrophobic ligand in the second solution has increased to the solubility limit, and that $$[L]=x. \qquad (3)$$

The concentration of the hydrophobic ligand that is actually input to the second solution is X (mol/L); and the amount that is input in excess of x (mol/L) associates with the hydrophilic probe molecule. Accordingly, the concentration of the association between the hydrophobic ligand and the hydrophilic probe molecule in such a case is $$[LP]=X-x. \qquad (4)$$

Because the mixing ratio of the hydrophobic ligand and the hydrophilic probe molecule is 1:α, the input concentration of the hydrophilic probe is Xα (mol/L), of which the concentration of Formula (4) is an association, and therefore the concentration of the free hydrophilic probe molecule is $$X\alpha-(X-x). \qquad (5)$$

Here, substituting Formula (3) to (5) into Formula (2) gives Formula (1) recited above.

The dissociation constant $Kd$ of the hydrophobic ligand and the hydrophilic probe molecule in the second solution can be calculated if the solubility x (mol/L) of the hydrophobic ligand in the second solution, the mixing ratio of 1:α of the hydrophobic ligand and the hydrophilic probe molecule in the first solution, and the solubility X (mol/L) of the hydrophobic ligand in the second solution in the first solution are known.

Figure 3:
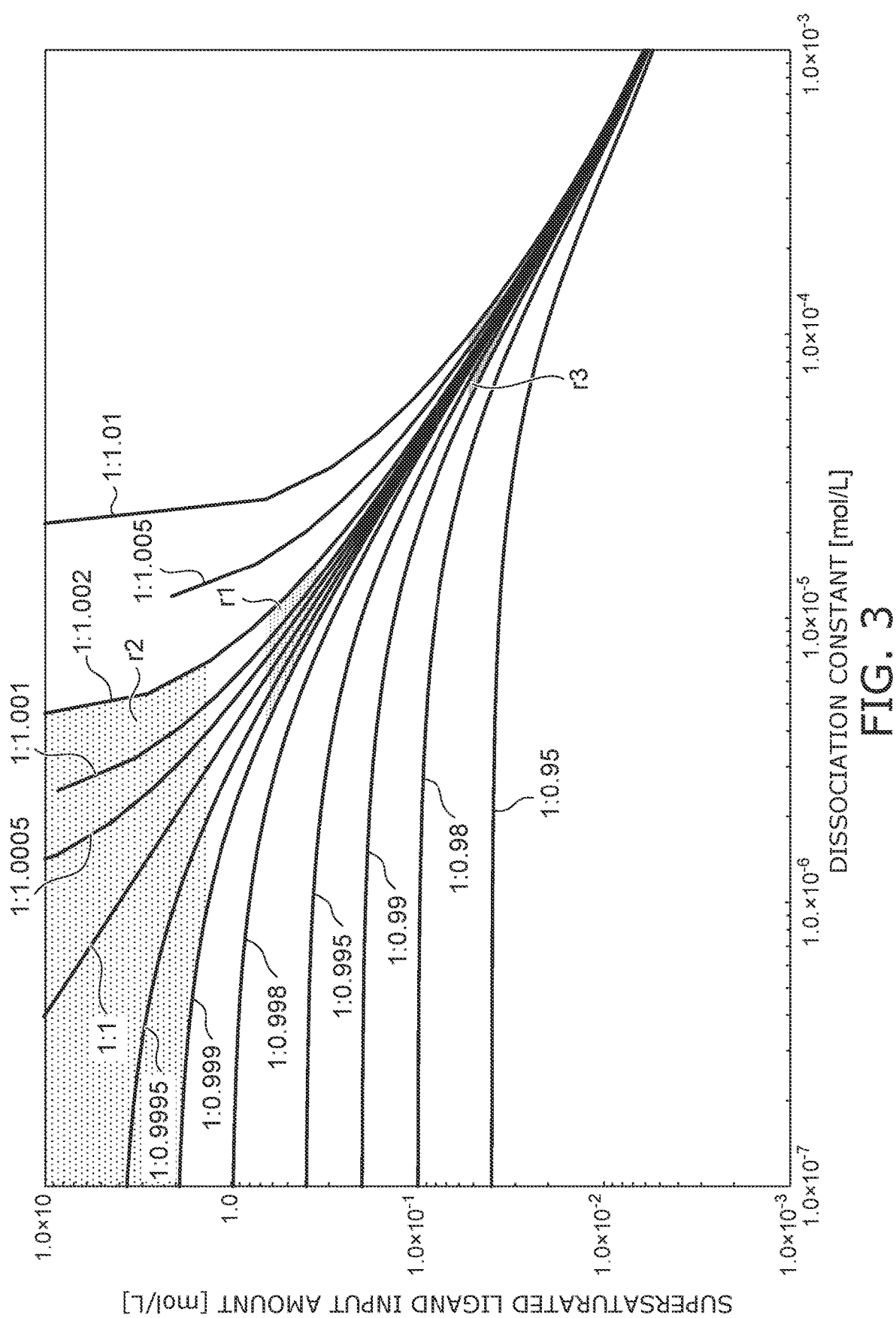
FIGS. 3 to 5 show calculation results for the one embodiment of the invention.

FIG. 3 will now be described.

FIG. 3 shows the results of assuming a solubility of the hydrophobic ligand in the second solution of 2 mM (0.002 mol/L) and using the calculation formulas described above to calculate the relationship between the dissociation constant of the hydrophobic ligand and the hydrophilic probe molecule in the second solution, the hydrophobic ligand:hydrophilic probe molecule ratio in the first solution, and the supersaturated concentration of the hydrophobic ligand of the first solution in the second solution.

The horizontal axis is the dissociation constant of the hydrophobic ligand and the hydrophilic probe molecule in the second solution. The vertical axis is the supersaturated concentration of the hydrophobic ligand of the first solution in the first solution. The calculation results when the hydrophobic ligand:hydrophilic probe molecule ratio in the first solution is modified are plotted in the figure as multiple lines.

When the hydrophobic ligand:hydrophilic probe molecule ratio in the first solution is 1:1, the calculation result is a straight line for all dissociation constants and has a constant slope, i.e., a constant detection sensitivity.

On the other hand, it can be seen that when the value of α in the hydrophobic ligand:hydrophilic probe molecule ratio in the first solution of 1:α is greater than 1, the slope is large, i.e., the sensitivity is high, the slope abruptly rises as the dissociation constant decreases, and the error with respect to the accuracy of the α value undesirably increases.

On the other hand, it can be seen that when the value of α in the hydrophobic ligand:hydrophilic probe molecule ratio in the first solution of 1:α is less than 1, the slope becomes relaxed as the dissociation constant decreases; and if the sensitivity is to be maintained, the value of α must be closer to 1, that is, the accuracy of the mixing ratio must be higher.

For example, when the dissociation constant is 10 µmol/L, the dissociation constant evaluation can have a measurement error in the cross-hatched area shown as r1 (not less than 4 µmol/L and not more than 17 µmol/L) if the α value of the mixing ratio is within a range that is not less than 0.999 and not more than 1.002 (i.e., the mixing accuracy is within a 0.3% range).

However, when the dissociation constant is 1 µmol/L, the range of the mixing ratio can be measured only in the large cross-hatched error area shown as r2. Specifically, it is known only that the dissociation constant is not more than 5 to 7 µmol/L.

Conversely, when the dissociation constant is 100 µmol/L, even if the accuracy of the α value of the mixing ratio is allowed in a range that is not less than 0.99 and not more than 1.01 (i.e., the mixing accuracy is within a 2% range), the dissociation constant evaluation can have a measurement error in the cross-hatched area shown as r3 (not less than 55 µmol/L and not more than 150 µmol/L).

In other words, by using the binding capacity measurement technology of the embodiment of the invention, the dissociation constant can be evaluated when only a weak binding capacity exists, for which conventional art is unsuited.

Figure 4:
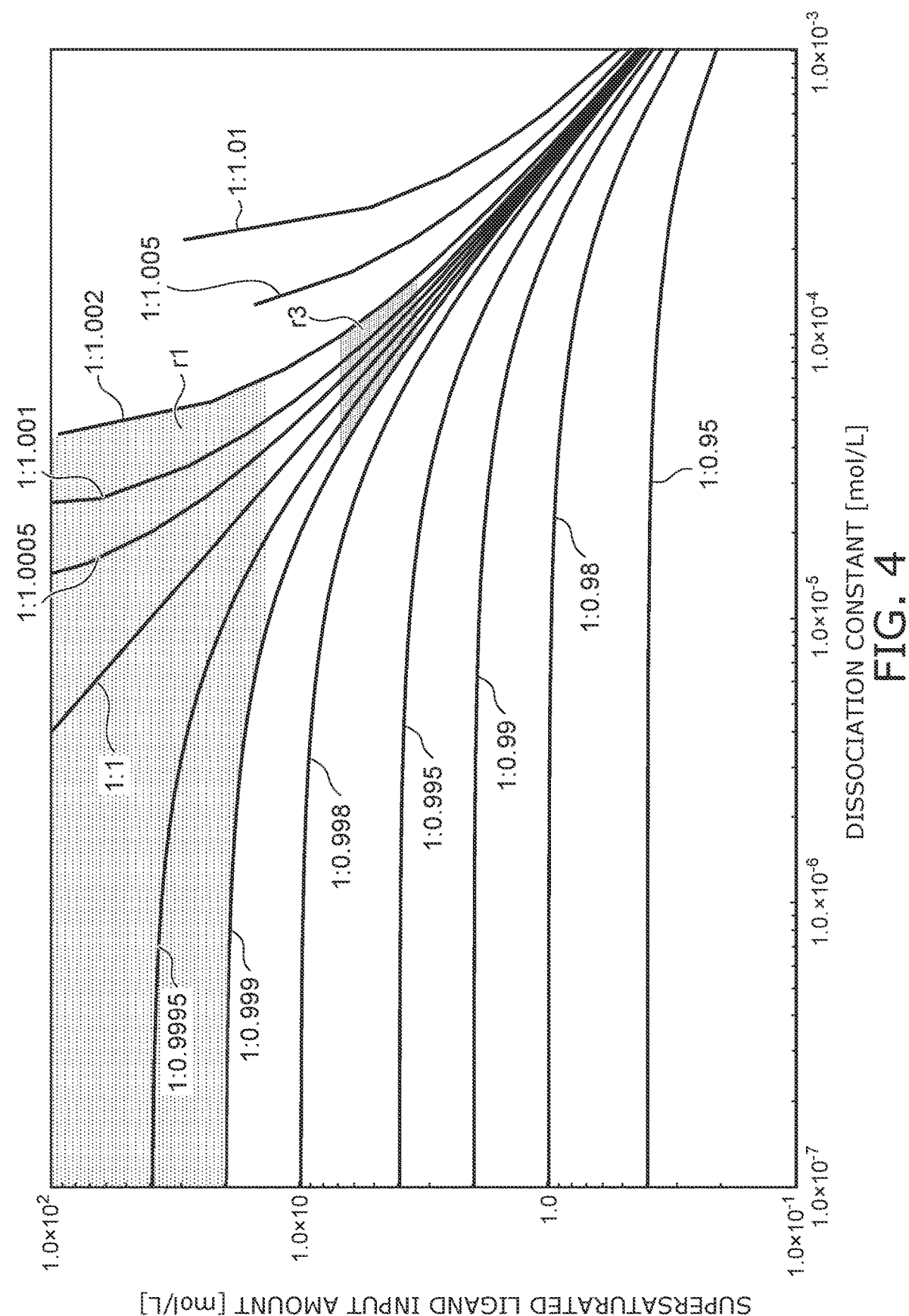

FIG. 4 will now be described.

FIG. 4 shows the results of assuming a solubility of the hydrophobic ligand in the second solution of 20 mM (0.02 mol/L), i.e., 10 times that of FIG. 3, and using the calculation formulas to calculate the relationship between the dissociation constant of the hydrophobic ligand and the hydrophilic probe molecule in the second solution, the hydrophobic ligand:hydrophilic probe molecule ratio in the first solution, and the supersaturated concentration of the hydrophobic ligand of the first solution in the second solution.

For example, when the dissociation constant is 10 µmol/L, the measurement error undesirably spreads to the wide cross-hatched area shown as r1 even when the α value of the mixing ratio is within a range that is not less than 0.999 and not more than 1.002 (i.e., the mixing accuracy is within a 0.3% range). Specifically, it is known only that the dissociation constant is not more than 40 to 70 µmol/L.

When the dissociation constant is 100 µmol/L, the dissociation constant evaluation can have a measurement error in the cross-hatched area shown as r3 (not less than 50 µmol/L and not more than 170 µmol/L) if the α value of the mixing ratio is within a range that is not less than 0.999 and not more than 1.002 (i.e., the mixing accuracy is within a 0.3% range).

However, it can be seen that the detection sensitivity is substantially an order of magnitude worse than the calculation results of FIG. 3.

Figure 5:
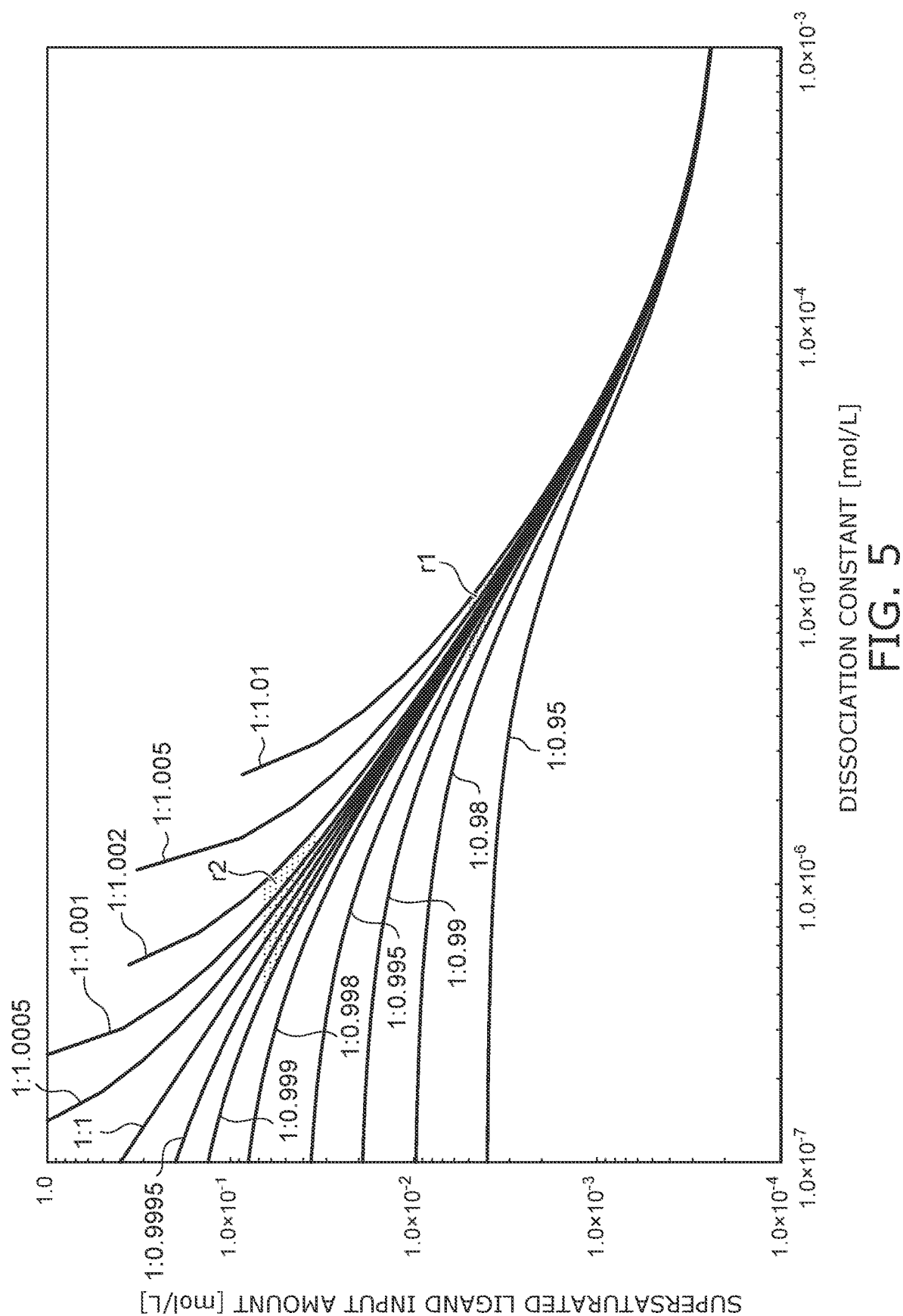

FIG. 5 will now be described.

FIG. 5 shows the results of assuming a solubility of the hydrophobic ligand in the second solution of 0.2 mM (0.0002 mol/L) and using the calculation formulas to calculate the relationship between the dissociation constant of the hydrophobic ligand and the hydrophilic probe molecule in the second solution, the hydrophobic ligand:hydrophilic probe molecule ratio in the first solution, and the supersaturated concentration of the hydrophobic ligand of the first solution in the second solution.

The measurement is possible for this solubility condition, even when the dissociation constant is 1 µmol/L. In other words, the dissociation constant evaluation can have a measurement error in the cross-hatched area shown as r2 (not less than 0.4 µmol/L and not more than 1.7 µmol/L) if the α value of the mixing ratio is within a range that is not less than 0.999 and not more than 1.002 (i.e., the mixing accuracy is within a 0.3% range).

When the dissociation constant is 10 µmol/L, the dissociation constant evaluation can have a measurement error in the cross-hatched area shown as r1 (not less than 6 µmol/L and not more than 15 µmol/L) even when the accuracy of the α value of the mixing ratio is allowed up to a range that is not less than 0.99 and not more than 1.01 (i.e., the mixing accuracy is within a 2% range).

In other words, the measurement accuracy of the binding capacity measurement technology of the embodiment increases as the water solubility of the ligand decreases (hydrophobicity increases).

In other words, the measurement accuracy of the binding capacity measurement technology of the embodiment is higher for a combination of a probe molecule with a ligand having low water solubility or a ligand having a weak binding capacity, even when conventional binding capacity measurement technology is unsuitable.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A binding capacity evaluation apparatus, comprising:
a first solution tank into which a first solution is input, the first solution including a hydrophobic substance and a hydrophilic substance;
a second solution tank into which a second solution is input, the second solution including water as a major component;
a solution supply device supplying the first solution from the first solution tank to the second solution tank at a controlled rate;
a stirring device stirring a third solution inside the second solution tank, the third solution including a mixture of the first and second solutions;
a light irradiation device irradiating light on the third solution;
a light-receiving device receiving light passing through the third solution; and
a light transmittance measuring device measuring light transmittance by using an intensity of the light received by the light-receiving device; and
an arithmetic device configured to detect an input of a supersaturated amount of the hydrophobic substance into a constant amount of the second solution by a decrease in the light transmittance.

2. The apparatus according to claim 1, further comprising a recording device configured to record an amount of the first solution into the second solution, and an amount of a fourth solution into the second solution, the fourth solution being a solution obtained by removing the hydrophilic substance from the first solution,
wherein the arithmetic device is configured to:
calculate a concentration X of the hydrophobic substance in the second solution by using a supply amount of the first solution into the second solution when the hydrophobic substance becomes supersaturated in the second solution, and
calculate a concentration x of the hydrophobic substance in the second solution from the amount of the fourth solution into the second solution by the decrease in the light transmittance, and
calculate a dissociation constant Kd of the hydrophobic substance and the hydrophilic substance in the second solution by using a calculation formula of Formula (1) and by using X, x, and a mole equivalent ratio α of the hydrophilic substance mixed in the first solution with respect to the hydrophobic substance, $$Kd = \frac{x^2 + xX(\alpha - 1)}{X - x}. \quad (1)$$

3. The apparatus according to claim 2, wherein,
the mole equivalent ratio α is 1.

4. A binding capacity evaluation method, comprising:
a first process including:
supplying a first solution to a second solution at a controlled rate, the first solution including a hydrophobic substance and a hydrophilic substance with a mole equivalent ratio of 1:α, the second solution including water as a major component,
irradiating light on a third solution, and measuring a light transmittance by using an intensity of light passing through the third solution, the third solution including a mixture of the first and second solutions,
using the light transmittance to detect when the hydrophobic substance becomes supersaturated in the second solution, and
calculating a concentration X of the hydrophobic substance in the second solution by using a supply amount of the first solution into the second solution when the hydrophobic substance becomes supersaturated in the second solution; and
a second process including:
supplying a first solution to a second solution at a controlled rate, the first solution including the hydrophobic substance but not including the hydrophilic substance, the second solution including water as a major component,
irradiating light on a third solution, and measuring a light transmittance by using an intensity of light passing through the third solution, the third solution including a mixture of the first and second solutions,
using the light transmittance to detect when the hydrophobic substance becomes supersaturated in the second solution, and
calculating a concentration x of the hydrophobic substance in the second solution by using a supply amount of the first solution into the second solution when the hydrophobic substance becomes supersaturated in the second solution,
a dissociation constant Kd of the hydrophobic substance and the hydrophilic substance in the second solution being calculated from α, X, and x by using Formula (1), $$Kd = \frac{x^2 + xX(\alpha - 1)}{X - x}. \quad (1)$$

* * * * *